United States Patent Office

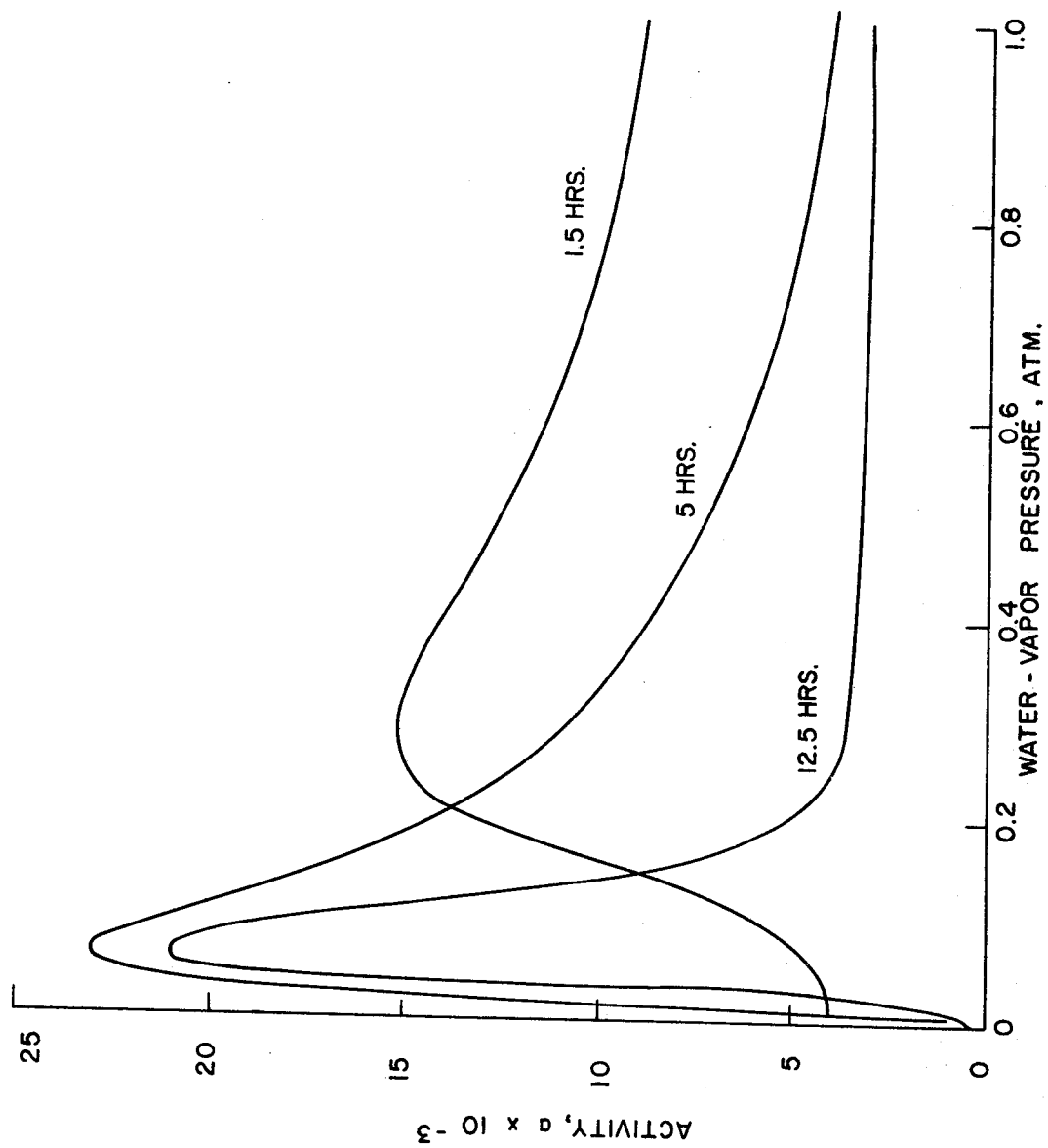

3,493,519
Patented Feb. 3, 1970

3,493,519
HYDROTHERMALLY STABLE CATALYSTS OF HIGH ACTIVITY AND METHODS FOR THEIR PREPARATION
George T. Kerr, Joseph N. Miale, and Richard J. Mikovsky, Trenton, N.J., assignors to Mobil Oil Corporation, a corporation of New York
Filed Mar. 30, 1966, Ser. No. 538,655
Int. Cl. B01j *11/40;* C01b *33/26*
U.S. Cl. 252—455                         7 Claims

ABSTRACT OF THE DISCLOSURE

A process for producing a hydrothermally stable catalyst composition of high hydrocarbon conversion activity which comprises calcining an ammonium-Y crystalline aluminosilicate in the presence of rapidly-flowing steam, base-exchanging the resultant steam product with an ammonium salt, treating the resultant exchanged product with a chelating agent capable of combining with aluminum at a pH between about 7 and 9, and recovering the final product.

---

This invention relates to hydrothermally stable catalysts of high activity and methods for their preparation and, more particularly, to hydrothermally stable crystalline aluminosilicate catalysts having extremely high hydrocarbon conversion activity, to methods for preparing such catalysts and to the conversion of hydrocarbons in the presence of such catalysts.

Zeolitic materials, both natural and synthetic, have been demonstrated in the past to have catalytic capabilities for the conversion of organic materials. Such zeolitic materials are ordered, porous crystalline aluminosilicates having a definite crystalline structure within which there are a large number of small cavities which are interconnected by a number of still smaller channels.

These materials include a wide variety of positive-ion-containing crystalline aluminosilicates, both natural and synthetic, which can be described as a rigid three-dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. The valence of the tetrahedrally coordinated aluminum is balanced by the inclusion in the crystal of a cation, for example, an alkali metal or an alkaline earth metal cation. This equilibrium can be expressed by formula wherein the ratio of Al to the number of the various cations, such as Ca/2, Sr/2, Na, K or Li, is equal to unity. One cation may be exchanged either in entirety or partially by another cation utilizing conventional ion-exchange techniques. By means of such cation exchange, it is possible to vary the size of the pores in a given aluminosilicate by suitable selection of the particular cation. The spaces between the tetrahedra are occupied by molecules of water prior to dehydration. The zeolite is dehydrated to activate it for use as a catalyst.

Synthetic crystalline aluminosilicates are ordinarily prepared initially in the sodium form of the crystal, the process of preparation involving heating, in aqueous solution, an appropriate mixture of oxides, or of materials whose chemical composition can be completely represented as a mixture of oxides $Na_2O$, $Al_2O_3$, $SiO_2$ and $H_2O$, at a temperature of approximately 100° C. for periods of 15 minutes to 90 hours or more. The product which crystallizes within this hot mixture is separated therefrom and water washed until the water in equilibrium with the aluminosilicate has a pH in the range of 9 to 12. The aluminosilicate may then be activated by heating until dehydration is attained.

A description of such aluminosilicates, methods for their preparation and examples of their uses are found in U.S. Patents 2,882,243, 2,971,824, 3,033,778 and 3,130,007.

A particularly catalytically active form of crystalline aluminosilicates has been the acid form. It has been prepared in the past by exchanging metal aluminosilicates with acid solutions. However, this treatment has proven too severe for most of the aluminosilicates, especially those with low silica-to-alumina mol ratios, resulting in their destruction. A more common technique for converting a crystalline aluminosilicate to its acid form involves its initial conversion to the ammonium form through the use of base exchange, and calcining the resultant ammonium aluminosilicate to cause thermal degradation of the ammonium ions. Such degradation results in the release of ammonia gas and the formation of the desired protonic or hydrogen cationic sites.

Calcination of ammonium crystalline aluminosilicates has previously been characterized by an inexactness in the definition of calcining conditions. In carrying out such calcination reactions the prior art has specified conditions such as time, temperature, and the nature of the calcination atmosphere, but no consideration has been given to the possible influence of hydrolytic reactions during calcination. This has effectively prevented prior-art investigators from appreciating the extreme importance of calcination conditions to the activity of the subsequent catalysts produced therefrom and has resulted in the formation of catalysts, such as the acid aluminosilicates, which are hydrothermally unstable.

It is, accordingly, a primary object of the present invention to provide new hydrothermally stable crystalline aluminosilicate catalysts of extremely high hydrocarbon conversion activity, and a process for producing them.

It is another important object of the present invention to provide a novel technique for preparing hydrothermally stable crystalline aluminosilicate catalysts of extremely high activity wherein the aluminosilicate is rendered hydrothermally stable during, rather than after, calcination.

It is a further object of the present invention to provide a novel technique for preparing hydrothermally stable crystalline aluminosilicate catalysts of extremely high activity involving selective removal of aluminum atoms from the framework of the aluminosilicate producing a crystal lattice deficient in aluminum atoms prior to completion of calcination.

In accordance with the present invention, there have now been discovered new hydrothermally stable hydrogen-Y crystalline aluminosilicate catalysts of extremely high hydrocarbon conversion activity produced by a process comprising a combination of steps involving calcining ammonium-Y aluminosilicates in the presence of rapidly-flowing steam, base exchanging the resultant product with an ammonium salt, and chelating with an agent capable of combining with aluminum, at a pH about 7 or over.

The resultant catalysts of this invention yield fantastically high α-cracking activities of about 500,000 to 3,000,000. Indeed, these are the highest activities ever observed for a hydrogen faujasite.

The ammonium-Y aluminosilicate is first calcined in the presence of rapidly flowing steam resulting, presumably, in the formation of lattice aluminum defects, aluminum containing cations, and other non-framework aluminum which we believe exists as amorphous hydrated alumina. Base exchange with an ammonium salt, preferably ammonium chloride, transforms the product back into the ammonium form, and chelation preferably with the ammonium salts of ethylenediaminetetraacetic acid, and more preferably, wtih diammonium dihydrogen ethylenediaminetetraacetate removes the amorphous aluminum-containing material. Chelation pH should be about 7–9, preferably, 7 to 8, to prevent further destruction of the aluminosilicate structure. As mentioned, while chelation may be with any agent capable of combining with aluminum, care should be taken that the reaction mixture pH is within the prescribed ranges. A finishing calcination in dry air, by conventional means, produces the superactive catalysts of the invention. In a preferred embodiment of this invention, as a pretreating step, the ammonium-Y starting material is contacted with a solution of diammonium dihydrogen ethylenediaminetetraacetate in order to remove any amorphous agglomerates that may be present in the channels.

In another specific embodiment of the invention, the ammonium-Y aluminosilicate is calcined in the presence of rapidly flowing steam, and then base exchanged with an ammonium salt to obtain a substance which on calcination yields a hydrothermally stable, active catalyst. In a still further embodiment of the present invention, the ammonium-Y aluminosilicate is subjected to calcination temperature under controlled partial pressures of water vapor, to yield a hydrothermally stable, active hydrogen aluminum-Y aluminosilicate.

Hydrothermal stability as referred to above and henceforth is determined first by sorbing water on the catalyst at room temperature and then subjecting the catalyst to an elevated temperature by placing it into a muffle furnace operating at about 300° to 900° C. Subsequent loss of crystallinity as detected by X-ray diffraction indicates hydrothermal instability.

Although the invention has been defined above, in terms of zeolite-Y for the sake of convenience, the zeolites which may be treated in accordance with the present invention comprise ammonium crystalline aluminosilicates having a mol ratio of silica to alumina of at least 3. This, of course, includes the crystalline aluminosilicates having a faujasite crystal structure and commonly designated as zeolite-Y.

It is believed that the phenomenon involved in the production of catalysts having both excellent hydrothermal stability and extremely high hydrocarbon conversion activity may be explained in connection with the following suggested mechanism, which is not to be deemed as limitative in nature.

Hydrogen zeolite-Y, prepared by the calcination of ammonium zeolite-Y, has a structure that can be represented diagrammatically as:

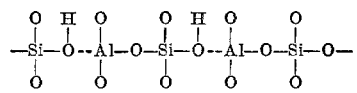

The protons appear to be coordinated to lattice framework oxygens to form silanol (Si—OH) groups with disruption or weakening of the aluminum-oxygen bonds (—O—Al). This weakened bond between aluminum and oxygen explains the relative instability of such acid zeolites as (zeolite) X and A, that are relatively rich in aluminum.

The aluminum atoms in the lattice framework of hydrogen zeolites can react with water resulting in the removal of aluminum from the lattice:

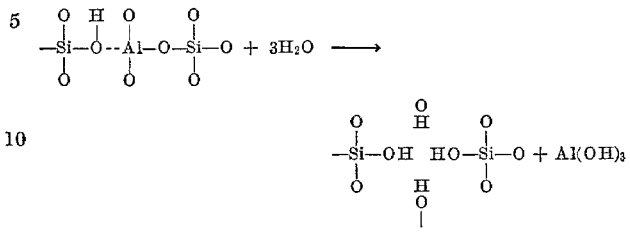

This hydrolysis is a rate process with a positive temperature coefficient.

The aluminum removed from the lattice is capable of further reaction with cationic hydrogen to yield aluminum-containing cations:

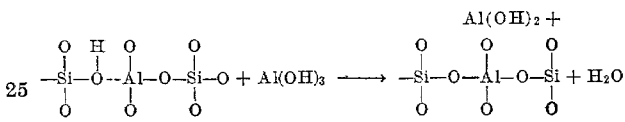

A variety of aluminum cations can be obtained, $Al(OH)_2{}^+$, $Al(OH)^{2+}$ or $Al^{3+}$, depending upon the number of protons that are neutralized by the aluminum removed from the lattice. This neutralization reaction serves as a control on the degree to which aluminum can be removed from the framework. If each $Al(OH)_3$ reacts with one proton, $Al(OH)_2{}^+$ cations are formed and one-half of the tetrahedral aluminum can be removed from the lattice. The formation of $Al(OH)^{2+}$ and $Al^{3+}$ restricts the degree of hydrolysis of lattice aluminum to one-third and one-fourth, respectively.

Hydrolysis and proton neutralization of the hydrogen zeolite Y are competing rate reactions. If calcining conditions are such that hydrolysis greatly exceeds the rate of neutralization, then structure (A) above will predominate. The number of aluminum sites that can undergo hydrolysis in zeolite-Y is sufficient to cause collapse of the crystal lattice. If, however, the rates of neutralization and hydrolysis are commensurate, the hydrothermally stable substance, which appears to be a hydrogen aluminum-Y, will be produced.

The structures above are further confirmed by simple titration with aqueous sodium hydroxide. The hydrothermally unstable zeolite contains a substantially higher titratable acid concentration; the hydrothermally stable zeolite contains a substantially higher concentration of base-exchangeable aluminum.

Catalysts produced in accordance with the present invention are extremely catalytically active and are generally useful in hydrocarbon conversion reactions in which typical acid catalysts are presently employed. For example, the subject catalysts have extremely high cracking activity and may be used to convert materials such as gas oils, full crudes, paraffins, olefins and the like from high to low molecular weight materials. They may also be used in alkylation, dealkylation, isomerization, disproportionation, transalkylation and many other reactions. Typical reactions in which they may be used are, for example, disproportionation reactions involving the conversion of toluene to benzene and xylenes or the conversion of methylnaphthalene to naphthalene and dimethylnaphthalenes. A typical transalkylation reaction involves the reaction of benzene and methylnaphthalene to form toluene and naphthalene.

The invention will be described, further in connection with the following specific examples, but it is to be understood that these are merely illustrative in nature and are not intended to limit the invention thereto.

EXAMPLE 1

A sample of ammonium-Y aluminosilicate was calcined in flowing dry air (60 cc./min.) at 1,000° F. for a period of 5 hours. The resultant catalyst was an hydrogen-Y aluminosilicate, which was found to have a non-aluminum-deficient crystal lattice. It was found to have a cracking activity of 1,000 by means of a standard α-test. [Note: Cracking activity is obtained by a standard α-test which is fully described in a letter to the editor entitled "Superactive Crystalline Aluminosilicate Hydrocarbon Catalysts" by P. B. Weisz and J. N. Miale appearing in "Journal of Catalysis," vol. 4, No. 4, August 1965, pp. 527–529.]

In order to demonstrate the effects on hydrothermal stability of the catalyst produced according to the procedure of Example 1, the experiment described in Example 2 was conducted.

EXAMPLE 2

A portion of the ammonium zeolite-Y of Example 1 was placed into a Petri dish in a thin layer and put into a furnace preheated to 600° C. for five hours. Cyclohexane and water-sorptive capacities were then determined for the sample. The water-loaded portion was reactivated by placing it back in the furnace preheated to 600° C. Cyclohexane sorption was then run on this portion. A summary of the results is given:

|  | Sorption, percent | | |
|---|---|---|---|
|  | Initial Sample | | Reactivated Sample— |
|  | Cyclohexane | H₂O | Cyclohexane |
| NH₄Y | 20.0 | 33.0 | 1 | hour calcination period, the activity is decreased five-fold by increasing the partial pressure of water from 0.1 to 0.2 atmospheres. At a 1.5 hour calcination period, the activity is hardly affected by an increase in the partial pressure of water from 0.2 to 0.4 atmospheres.

All of the catalysts used in the above tests were found to be highly crystalline. However, those catalysts produced by calcination under less than 0.03 atmospheres of water vapor were found to be hydrothermally unstable and may be considered predominantly hydrogen-Y materials. Those catalysts prepared under more than 0.03 atmosphere of water vapor were hydrothermically stable, and may be considered to be hydrogen aluminum Y aluminosilicates. Their loss of activity with increasing water-vapor pressure and duration of calcination may be a result of a change in the average valence of the aluminum-containing cations. Thus, this would suggest that optimum activity is to be obtained not with the hydrothermally unstable hydrogen zeolite but with a catalyst containing a distribution of cations, some or all of which contain aluminum. This distribution of cations is a consequence of forcing all the rate processes in the calcination reaction into competition with each other under proper control of conditions.

A more detailed representation of the activity of Y-type catalysts produced by calcination of ammonium-Y zeolites, at 1,000° F. at varying calcination times and partial water vapor pressures is set forth in the following Table A, which also serves as additional examples of the invention.

TABLE A.—ACTIVITY OF Y-TYPE CATALYSTS PRODUCED BY CALCINATION OF AMMONIUM-Y ZEOLITE AT 1,000° F.

| Time of calcination (hrs.) | Pressure of Water Vapor (atm.) | | | | | |
|---|---|---|---|---|---|---|
|  | 0 | 0.033 | 0.065 | 0.02 | 0.25 | 1.0 |
| 1.5 | 4,100(−) |  | 3,600 | 9,100 | 15,000(+) | 4,100(+) |
| 3.0 | 8,300(−) |  |  |  |  |  |
| 5.0 | 1,000 | 20,000(+) | 23,000(+) |  | 12,000 | 6,000(+) |
| 10.5 | 600 | 17,000 | 21,000(+) | 6,300 | 4,000 | 4,100(+) |
| 29 | 550 |  |  |  |  | 3,000(+) |
| 88 | 200 |  |  |  |  |  |

The data show that the ammonium zeolite-Y, which did not have aluminum-lattice defects during the calcination treatment, was quite unstable hydrothermally.

As an illustration of one specific embodiment of the invention, wherein calcination in the presence of controlled amounts of water vapor produces an aluminum-cation zeolite lattice-deficient in aluminum, a series of tests were conducted, serving as examples of the invention, wherein several samples of ammonium-Y zeolites were calcined at 1,000° F. for varying times (1.5 hours, 5 hours and 12.5 hours) at different water vapor partial pressures. The data obtained from such tests are set forth in FIGURE 1 in which each curve represents the activity (in units of $\alpha \times 10^{-3}$) of a calcined Y zeolite as a function of the water vapor pressure at a given time of calcination. These data demonstrate that catalytic activities of the calcined Y zeolites, as measured by the standard α-test previously referred to, passes through maxima as the humidity of the calcination atmosphere is increased. Moreover, the magnitudes of these maxima in activity vary with duration of calcination and appear to reach their peak value between 1.5 and 12.5 hours. Control of the water vapor pressure to produce maximum activity is more critical during the longer calcinations where the activity maxima are sharper. For example, using a 12.5

In this table, the α-values for cracking activity are given as a function of the duration of calcination of the partial pressure of water vapor. Stability is indicated by the parenthetical plus signs and instability by the parenthetical minus signs, wherever measured. As can be seen, those catalysts prepared under less than 0.03 atm. of water vapor were hydrothermally unstable, or gave low α-values.

Products obtained from the controlled calcination treatment which takes advantage of the aluminum-lattice-defect crystalline aluminosilicate structure not only have high catalytic activity, as indicated, but may be further treated according to the procedures of this invention to produce catalysts having enormous activities far exceeding those known heretofore. More specifically, this is shown by the following examples.

EXAMPLE 3

A sample of NH₄Y aluminosilicate was treated with 0.25 M diammonium dihydrogen ethylenediaminetetraacetate. It was washed with water, dried at 105° C. and then calcined at 1000° F. in steam. An aliquot was base exchanged with 1 N NH₄Cl at room temperature for 18 hours, washed, and dried at 105° C. It was again treated with 0.25 M diammonium dihydrogen ethylenediaminetetraacetate at reflux temperature, washed, and dried at 105° C. Portions of products from each treatment were tested for n-hexane cracking activity. Activities and available analyses are tabulated below.

EXAMPLE 4

Another sample of NH$_4$Y of the same lot as in Example 3 was treated in the same manner as Example 3.

EXAMPLE 5

A sample of another batch of NH$_4$Y was treated as in Examples 3 and 4.

EXAMPLE 6

Another sample of NH$_4$Y was treated as in Examples 3–5 except that the first NH$_4$EDTA treatment was eliminated and the last two steps reversed.

| Example: | Treatment [1] | Relative nC$_6$ Cracking, $\alpha$ | Wt. percent SiO$_2$ | Percent Al$_2$O$_3$ | SiO$_2$ Al$_2$O$_3$ | Wt. percent N |
|---|---|---|---|---|---|---|
| 3 | — | 700 | 75.2 | 22.7 | 5.64 | 1.09 |
|   | A | 830 | 75.2 | 22.5 | 5.69 | 5.36 |
|   | B | 4,500 | | | | |
|   | C | 2×10$^5$ | | | | |
|   | A | 2.5×10$^5$ | 82.7 | 16.7 | 8.42 | 1.95 |
| 4 | — | 700 | 75.2 | 22.7 | 5.64 | 1.09 |
|   | A | 700 | 76.3 | 22.7 | 5.72 | 4.38 |
|   | B | 3,200 | | | | |
|   | C | 1.7×10$^5$ | | | | |
|   | A | 8.2×10$^5$ | 83.6 | 16.7 | 8.52 | 2.07 |
| 5 | — | 1,900 | 76.0 | 32.2 | 5.58 | |
|   | A | 2,000 | 76.9 | 22.3 | 5.86 | |
|   | B | 6,700 | 76.2 | 22.8 | 5.68 | |
|   | C | 6.3×10$^5$ | 77.5 | 20.7 | 6.36 | |
|   | A | 8×10$^5$ | 86.5 | 13.9 | 10.58 | |
| 6 | — | 1,900 | 76.0 | 23.2 | 5.58 | |
|   | B | 9,300 | | | | |
|   | A | 5.6×10$^5$ | 82.4 | 16.9 | 8.29 | |
|   | C | 8.7×10$^5$ | | | | |

A. Contact 90 min. at reflux temperature with 50 ml. 0.25 M diammonium dihydrogen ethylenediaminetetraacetate (ph $\geq$7.0) per ml. catalyst +H$_2$O wash + drying 1 hr. at 105° C. B. Calcination 90 min. at 1,000° F. in steam flowing at $\sim$700–1000 ml./min. at atmospheric pressure followed by He or N$_2$ purge until moisture-free. C. Base exchange in 1N NH$_4$Cl overnight ($\sim$18 hours) at room temperature, wash with water, dried 1 hr. at 105° C.)

As can be seen by the above data aluminum-deficient catalysts of enormously high activity are obtained using the process of the invention. The aluminosilicate produced after the steam calcination treatment of step B appears to be the hydrothermally stable hydrogen aluminum-Y aluminosilicate. While the sequence of steps as outlined in Examples 3 to 5 are preferred, it can be seen by the results obtained in Example 6 that the pretreatment step employing diammonium dihydrogen ethylenediamine-tetraacetate can be eliminated and the order of the last two steps reversed. Indeed it may be possible to eliminate the ammonium chloride base exchange step if the amount of chelating agent (which is, however, more expensive) is increased to provide sufficient ammonium ions for exchange with the aluminum cations formed by steaming. As mentioned previously, an important function of the chelating agent is to clear the channels of unwanted amorphous agglomerates in order to expose the maximum surface of the superactive catalyst species.

A crystalline aluminosilicate catalyst having excellent hydrothermal stability and high cracking activity produced by calcining the ammonium form aluminosilicate in the presence of water vapor, and subsequent base-exchange with NH$_4$Cl according to another specific embodiment of the invention, is illustrated in Example 7.

EXAMPLE 7

Ammonium-Y material, having a silica-to-alumina mol ratio of 5.32, was calcined at 1,000° F. and one atmosphere of steam. The rate of steam flow was about 700 cc./min. The resultant catalyst was a hydrogen-Y with an aluminum deficient lattice and an undetermined number of aluminum-containing cations. Its $\alpha$-value was 3,900.

The steamed material was then treated with an excess of 1N ammonium chloride solution for twenty hours at room temperature. This base exchange caused the material to revert to the ammonium form but, now, with a lattice-deficient structure. Calcination for three hours in a stream of dry air produced a catalyst with an $\alpha$-value of 130,000.

EXAMPLE 8

The procedure of Example 7 was repeated but with an ammonium-Y starting material of lower silica-to-alumina mol ratio, i.e., 4.97. In this case, exchange of the steamed material produced a lattice-deficient zeolite which, on calcination, showed an $\alpha$-value of 92,000. After 26 minutes on stream in the $\alpha$-test, the catalyst had an $\alpha$-value of 22,000. Regeneration with air at 1,000° F. restored this activity to 85,000. It is thus seen that such materials not only have extremely high activity, but are extremely hydrothermally stable and regenerable.

In connection with the catalysts of the present invention, it appears that both protonic cations and lattice defects are necessary for extremely high catalytic activity. Lattice defects by themselves are not particularly catalytically active. This may be best shown by reference to the following example.

EXAMPLE 9

A sodium-Y zeolite ($\alpha\sim$1) was given a treatment by ethylenediaminetetraacetate to remove 40% of the lattice aluminum atoms. The resultant material had an $\alpha$-value of 0.3 to 0.5, indicating a negligible effect of lattice defects. However, exchange of $\sim$75% of the sodium cations by excess ammonium ion from 0.6 N ammonium chloride solution produced a catalyst which, on calcination, showed an activity of $\sim$800.

What is claimed is:

1. A process for producing a hydrothermally stable catalyst composition of high hydrocarbon conversion activity which comprises calcining an ammonium-Y crystalline aluminosilicate in the presence of rapidly-flowing steam, base-exchanging the resultant steamed product with an ammonium salt, treating the resultant exchanged product with a chelating agent capable of combining with aluminum at a pH between about 7 and 9, and recovering the final product.

2. The catalyst composition produced according to the process of claim 1.

3. A process according to claim 1 wherein said chelating agent is selected from the ammonium salts of ethylenediaminetetraacetate.

4. A process for producing a hydrothermally stable catalyst composition of high hydrocarbon conversion activity which comprises treating an ammonium-Y crystalline aluminosilicate with diammonium dihydrogen ethylenediaminetetraacetate at a pH between about 7 and 9, thereafter contacting the resultant product with rapidly flowing steam, base-exchanging the resultant steamed product with an ammonium salt, subjecting the resultant exchanged product to another diammonium dihydrogen ethylenediaminetetraacetate treatment at a pH between about 7 and 9, and recovering the final product.

5. The catalyst produced according to the process of claim 4.

6. A process for producing a hydrothermally stable catalyst composition of high hydrocarbon conversion activity which comprises calcining an ammonium Y crystalline aluminosilicate in the presence of rapidly-flowing steam under a water vapor pressure of at least 0.033 atmosphere, base exchanging the resultant steamed product with an ammonium salt and recovering the final product.

7. The catalyst composition produced according to the process of claim 6.

References Cited

UNITED STATES PATENTS

| | | | |
|---|---|---|---|
| 3,321,521 | 5/1967 | Kerr | 252—455 X |
| 3,336,240 | 8/1967 | Erickson et al. | 208—120 X |
| 3,337,474 | 8/1967 | Cornelius et al. | 252—455 |
| 3,375,065 | 3/1968 | McDaniel et al. | 252—455 X |
| 3,293,192 | 12/1966 | Maher et al. | 252—455 |

DANIEL E. WYMAN, Primary Examiner

C. F. DEES, Assistant Examiner

U.S. Cl. X.R.

208—120

UNITED STATES PATENT OFFICE
CERTIFICATE OF CORRECTION

Patent No. 3,493,519  Dated February 3, 1970

Inventor(s) George T. Kerr, Joseph N. Miale and Richard J. Mikovsky

It is certified that error appears in the above-identified patent and that said Letters Patent are hereby corrected as shown below:

Column 6, last line in table, 200 should be listed under Column 0.065 instead of under Column 0.

Column 7, line 15 of table, Under %$Al_2O_3$ in Table, Example 5, line 1, "32.2" should be --23.2--.

SIGNED AND SEALED
NOV 24 1970

(SEAL)
Attest:

Edward M. Fletcher, Jr.
Attesting Officer

WILLIAM E. SCHUYLER, JR.
Commissioner of Patents